(12) United States Patent
Seetharaman et al.

(10) Patent No.: US 12,499,462 B2
(45) Date of Patent: Dec. 16, 2025

(54) METHODS, SYSTEMS, AND COMPUTER READABLE MEDIA FOR MODEL-FREE PRIVACY PRESERVING THERMAL LOAD MANAGEMENT

(71) Applicant: The Texas A&M University System, College Station, TX (US)

(72) Inventors: Sivaranjani Seetharaman, College Station, TX (US); Panganamala R. Kumar, College Station, TX (US); Le Xie, College Station, TX (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 115 days.

(21) Appl. No.: 18/019,022

(22) PCT Filed: Aug. 18, 2021

(86) PCT No.: PCT/US2021/046414
§ 371 (c)(1),
(2) Date: Jan. 31, 2023

(87) PCT Pub. No.: WO2022/040255
PCT Pub. Date: Feb. 24, 2022

(65) Prior Publication Data
US 2023/0298060 A1    Sep. 21, 2023

Related U.S. Application Data

(60) Provisional application No. 63/067,282, filed on Aug. 18, 2020.

(51) Int. Cl.
G06Q 30/0201  (2023.01)
H02J 3/00  (2006.01)
H02J 3/14  (2006.01)

(52) U.S. Cl.
CPC .......... *G06Q 30/0206* (2013.01); *H02J 3/003* (2020.01); *H02J 3/14* (2013.01); *H02J 2310/64* (2020.01)

(58) Field of Classification Search
CPC .......... H02J 3/003; H02J 3/14; H02J 2310/64; G06Q 30/0206
See application file for complete search history.

(56) References Cited

U.S. PATENT DOCUMENTS 7,274,975 B2 *   9/2007 Miller ................. H02J 3/14
                                                    700/295
8,019,697 B2 *   9/2011 Ozog .................. H02J 7/35
                                                    705/400

(Continued)

FOREIGN PATENT DOCUMENTS

CN       106022548 A  * 10/2016  ............. G06Q 10/04
CN       107112752 A  *  8/2017  ............. H02J 3/008

(Continued)

OTHER PUBLICATIONS

Xinxin, Fang, "Revisit the Electricity price formulation: A formal definition, proofs, and examples", published by Elsevier in Apr. 2020 (Year: 2020).*

(Continued)

*Primary Examiner* — Omar Zeroual
(74) *Attorney, Agent, or Firm* — Jenkins, Taylor & Hunt, P.A.

(57) ABSTRACT

Methods, systems, and computer readable media for thermal load management of a collection of power consumers managed by an electric power aggregator. In some examples, a system includes a scheduling subsystem, implemented on one or more processors, configured for determining a plurality of cooling or heating control schedules for the collection of power consumers by forecasting one or more wholesale electricity price peaks. The system includes a control (Continued)

system implemented on one or more processors. The control system is configured for carrying out the cooling or heating control schedules at the individual consumer-level. The control system is configured for guaranteeing, for each power consumer of the collection of power consumers, a comfort constraint specified by a bilevel thermostat for the power consumer, wherein the comfort constraint comprises a lower level bound temperature and an upper bound temperature that the power consumer is willing to tolerate.

8 Claims, 8 Drawing Sheets

(56) References Cited

U.S. PATENT DOCUMENTS

| | | | | |
|---|---|---|---|---|
| 8,091,795 | B1* | 1/2012 | McLellan | G05D 23/1923 236/94 |
| 8,942,857 | B2 | 1/2015 | Anderson et al. | |
| 9,817,375 | B2* | 11/2017 | Li | F24F 11/46 |
| 9,946,235 | B2* | 4/2018 | Holub | G05B 15/02 |
| 10,077,915 | B2 | 9/2018 | Lu et al. | |
| 10,146,237 | B2* | 12/2018 | Turney | F24F 11/89 |
| 10,389,116 | B2* | 8/2019 | Tani | H02J 13/00034 |
| 10,443,873 | B1* | 10/2019 | Johnson | F24F 11/64 |
| 11,525,594 | B1* | 12/2022 | Hinson | F24F 11/64 |
| 2003/0182250 | A1* | 9/2003 | Shihidehpour | G06Q 30/0202 705/7.31 |
| 2004/0215529 | A1* | 10/2004 | Foster | G06Q 30/0601 705/26.1 |
| 2005/0137959 | A1* | 6/2005 | Yan | G06Q 20/102 705/40 |
| 2007/0288403 | A1* | 12/2007 | Subramanian | G06Q 50/06 705/412 |
| 2009/0210081 | A1* | 8/2009 | Sustaeta | H04L 67/125 715/702 |
| 2010/0076835 | A1* | 3/2010 | Silverman | G06Q 30/0233 705/14.33 |
| 2010/0138363 | A1* | 6/2010 | Batterberry | G06Q 10/04 700/297 |
| 2010/0179704 | A1* | 7/2010 | Ozog | H02J 7/35 703/2 |
| 2010/0324962 | A1* | 12/2010 | Nesler | G06Q 50/163 705/412 |
| 2011/0055287 | A1* | 3/2011 | Sun | G06Q 10/06 707/805 |
| 2011/0184562 | A1* | 7/2011 | Amundson | G06Q 30/00 715/702 |
| 2011/0184565 | A1* | 7/2011 | Peterson | G05D 23/1923 700/278 |
| 2011/0191773 | A1* | 8/2011 | Pavel | G06F 1/329 718/100 |
| 2011/0231028 | A1* | 9/2011 | Ozog | H02J 3/14 700/291 |
| 2011/0231320 | A1* | 9/2011 | Irving | G06Q 30/08 713/300 |
| 2011/0238224 | A1* | 9/2011 | Schnell | G06Q 50/06 700/278 |
| 2011/0270453 | A1* | 11/2011 | Kalogridis | H02J 13/00034 700/291 |
| 2011/0282500 | A1* | 11/2011 | Long | G05B 17/02 700/287 |
| 2012/0083930 | A1* | 4/2012 | Ilic | G06Q 30/06 703/2 |
| 2012/0330465 | A1* | 12/2012 | O'Neill | F24F 11/64 700/276 |
| 2013/0268126 | A1* | 10/2013 | Iwami | F24F 11/52 700/276 |
| 2014/0039709 | A1* | 2/2014 | Steven | H02J 13/00034 700/291 |
| 2014/0214219 | A1* | 7/2014 | Katayama | H02J 3/28 700/291 |
| 2014/0222225 | A1* | 8/2014 | Rouse | G05B 15/02 700/291 |
| 2014/0242898 | A1* | 8/2014 | Richards | F24F 7/04 454/237 |
| 2014/0297206 | A1* | 10/2014 | Silverman | H02J 13/00034 702/58 |
| 2014/0316973 | A1* | 10/2014 | Steven | H02J 3/008 705/37 |
| 2015/0018985 | A1* | 1/2015 | Koch | G05B 15/02 700/90 |
| 2015/0295410 | A1* | 10/2015 | Hooshmand | G06Q 50/06 307/20 |
| 2015/0310461 | A1* | 10/2015 | Lee | G06Q 10/04 705/412 |
| 2016/0092978 | A1* | 3/2016 | Lian | H02J 3/008 705/412 |
| 2016/0109895 | A1* | 4/2016 | Schindler | G06Q 50/06 700/291 |
| 2016/0204607 | A1* | 7/2016 | Rogers, Jr. | H02J 3/28 307/31 |
| 2017/0074539 | A1* | 3/2017 | Bentz | G06F 3/0488 |
| 2017/0329291 | A1* | 11/2017 | Kopp | F24F 11/52 |
| 2017/0357224 | A1* | 12/2017 | Berrien | F24F 11/30 |
| 2017/0364105 | A1* | 12/2017 | Greene | F24F 11/523 |
| 2018/0026445 | A1* | 1/2018 | Kalsi | H02J 13/00017 705/37 |
| 2018/0087795 | A1 | 3/2018 | Okita et al. | |
| 2018/0150045 | A1* | 5/2018 | Burke | G05B 19/048 |
| 2018/0172309 | A1* | 6/2018 | Niikura | F24F 11/46 |
| 2018/0209675 | A1* | 7/2018 | Ridder | F24F 3/001 |
| 2018/0285989 | A1* | 10/2018 | Dong | G06Q 50/06 |
| 2018/0313557 | A1 | 11/2018 | Turney et al. | |
| 2019/0093914 | A1* | 3/2019 | Ristimäki | F24F 11/523 |
| 2019/0353377 | A1* | 11/2019 | Mao | F24F 11/79 |
| 2020/0025402 | A1* | 1/2020 | Bell | F24F 11/64 |
| 2020/0073342 | A1* | 3/2020 | Lee | G05B 17/02 |
| 2020/0074274 | A1* | 3/2020 | Fan | G06F 17/18 |
| 2020/0076196 | A1* | 3/2020 | Lee | H02J 3/008 |
| 2020/0132324 | A1* | 4/2020 | Rigg | F24F 11/72 |
| 2020/0175534 | A1* | 6/2020 | Aggarwala | G01W 1/02 |
| 2020/0274389 | A1* | 8/2020 | Islam | G06Q 50/06 |
| 2020/0279340 | A1* | 9/2020 | Guan | G06Q 40/04 |
| 2021/0296897 | A1* | 9/2021 | Cruickshank, III | H02J 3/14 |
| 2021/0325069 | A1* | 10/2021 | Cotton | F24F 5/0021 |
| 2021/0341164 | A1* | 11/2021 | Johnson | F24F 11/61 |
| 2022/0026864 | A1* | 1/2022 | Murugesan | G06N 3/045 |
| 2022/0122163 | A1* | 4/2022 | Obata | G06Q 30/0206 |
| 2022/0156828 | A1* | 5/2022 | Aisu | G06Q 30/08 |
| 2022/0244076 | A1* | 8/2022 | Karlgaard | H02J 3/381 |
| 2024/0405603 | A1* | 12/2024 | Nelson | H02J 13/00002 |

FOREIGN PATENT DOCUMENTS

| | | | | |
|---|---|---|---|---|
| CN | 111466063 | A * | 7/2020 | G06Q 10/06 |
| CN | 112348283 | A * | 2/2021 | G06Q 10/04 |
| CN | 113325701 | A * | 8/2021 | B60L 53/60 |
| WO | WO-2013126800 | A1 * | 8/2013 | G06Q 50/06 |
| WO | WO-2013166511 | A2 * | 11/2013 | G05B 17/02 |
| WO | WO-2016168503 | A1 * | 10/2016 | H04H 60/23 |
| WO | WO-2016186081 | A1 * | 11/2016 | F24F 11/41 |
| WO | WO-2017162910 | A1 * | 9/2017 | G06Q 50/06 |
| WO | WO-2018213630 | A1 * | 11/2018 | H02J 3/003 |
| WO | WO-2022040255 | A1 * | 2/2022 | H02J 3/14 |
| WO | WO-2024118794 | A2 * | 6/2024 | F24F 11/80 |

OTHER PUBLICATIONS

Bethany Frew, "Impacts of price formation efforts considering high renewable penetration high renewable penetration levels and system resource adequacy targets", published by NREL in May 2020 (Year: 2020).*

Severin Borenstein, "the long run efficiency of real time electricity pricing", published by the Energy Journal, in 2005 (Year: 2005).*

Wollenberg, "monitoring and optimization for power Grids: a signal processing perspective", published by IEEE in Aug. 2013 (Year: 2013).*

(56) References Cited

OTHER PUBLICATIONS

Siyu Zhou, "an optimized heterogeneous structure LSTM network for electricity price forecasting", published by IEEE in 2019 (Year: 2019).*

Oktay Tas, "Electricity Price Forecasting Using Recurrent neural Networks", published by MDPI in 2018 (Year: 2018).*

Avci et al., "Residential hvac load control strategy in real-time electricity pricing environment," in 2012 IEEE Energytech. IEEE, 2012, pp. 1-6.

Baldi et al., "Joint energy demand and thermal comfort optimization in photovoltaic-equipped interconnected microgrids," Energy Conversion and Management, vol. 101, pp. 352-363, 2015.

Bashash et al., "Modeling and control insights into demand-side energy management through setpoint control of thermostatic loads," in Proceedings of the 2011 American Control Conference. IEEE, 2011, pp. 4546-4553.

Bhattacharya et al., "Economic operation of thermostatic loads under time varying prices: An optimal control approach," IEEE Transactions on Sustainable Energy, vol. 10, No. 4, pp. 1960-1970, 2018.

Bhattacharyya et al., "A fuzzy logic based approach to direct load control," IEEE Transactions on Power Systems, vol. 11, No. 2, pp. 708-714, 1996.

Callaway et al., "Achieving controllability of electric loads," Proceedings of the IEEE, vol. 99, No. 1, pp. 184-199, 2010.

Callaway et al., "Tapping the energy storage potential in electric loads to deliver load following and regulation, with application to wind energy," Energy Conversion and Management, vol. 50, No. 5, pp. 1389-1400, 2009.

Carreiro et al., "Energy management systems aggregators: A literature survey," Renewable and Sustainable Energy Reviews, vol. 73, pp. 1160-1172, 2017.

Claessens et al., "Modelfree control of thermostatically controlled loads connected to a district heating network," Energy and Buildings, vol. 159, pp. 1-10, 2018.

Docimo et al., "Demand response using heterogeneous thermostatically controlled loads: Characterization of aggregate power dynamics," Journal of Dynamic Systems, Measurement, and Control, vol. 139, No. 10, 2017.

Fontes et al., "Optimal control of thermostatic loads for planning aggregate consumption: Characterization of solution and explicit strategies," IEEE Control Systems Letters, vol. 3, No. 4, pp. 877-882, 2019.

Halder et al., "Architecture and algorithms for privacy preserving thermal inertial load management by a load serving entity," IEEE Transactions on Power Systems, vol. 32, No. 4, pp. 3275-3286, 2016.

Halder et al., "Optimal power consumption for demand response of thermostatically controlled loads," Optimal Control Applications and Methods, vol. 40, No. 1, pp. 68-84, 2019.

Hao et al., "Ancillary service to the grid through control of fans in commercial building hvac systems," IEEE Transactions on smart grid, vol. 5, No. 4, pp. 2066-2074, 2014.

Heffner et al., "Loads providing ancillary services: Review of international experience," 2008.

Notification of Transmittal of the International Search Report and the Written Opinion of the International Searching Authority, or the Declaration for International Patent Application Serial No. PCT/US2021/046414 dated Nov. 23, 2021.

Kalsi et al., "Development and validation of aggregated models for thermostatic controlled loads with demand response," in 2012 45th Hawaii International Conference on System Sciences. IEEE, 2012, pp. 1959-1966.

Kazmi et al., "Multi-agent reinforcement learning for modeling and control of thermostatically controlled loads," Applied energy, vol. 238, pp. 1022-1035, 2019.

Kirschen et al., "Demand-side view of electricity markets," IEEE Transactions on power systems, vol. 18, No. 2, pp. 520-527, 2003.

Koch et al., "Modeling and control of aggregated heterogeneous thermostatically controlled loads for ancillary services," in Proc. PSCC. Citeseer, 2011, pp. 1-7.

Kurucz et al., "A linear programming model for reducing system peak through customer load control programs," IEEE Transactions on Power Systems, vol. 11, No. 4, pp. 1817-1824, 1996.

Lee et al., "Optimization and implementation of a load control scheduler using relaxed dynamic programming for large air conditioner loads," IEEE Transactions on Power Systems, vol. 23, No. 2, pp. 691-702, 2008.

Liu et al., "Optimal privacy-preserving load scheduling in smart grid," in 2016 IEEE Power and Energy Society General Meeting (PESGM). IEEE, 2016, pp. 1-5.

Malhame et al., "Electric load model synthesis by diffusion approximation of a high-order hybrid-state stochastic system," IEEE Transactions on Automatic Control, vol. 30, No. 9, pp. 854-860, 1985.

Mathieu et al., "Arbitraging intraday wholesale energy market prices with aggregations of thermostatic loads," IEEE Transactions on Power Systems, vol. 30, No. 2, pp. 763-772, 2014.

Mathieu et al., "State estimation and control of electric loads to manage real-time energy imbalance," IEEE Transactions on Power Systems, vol. 28, No. 1, pp. 430-440, 2012.

Mathieu et al., "Using residential electric loads for fast demand response: The potential resource and revenues, the costs, and policy recommendations," in ACEEE Summer Study on Energy Efficiency in Buildings. Citeseer, 2012, pp. 189-203.

Meyn et al., "Ancillary service to the grid using intelligent deferrable loads," IEEE Transactions on Automatic Control, vol. 60, No. 11, pp. 2847-2862, 2015.

Nguyen et al., "Energy management for households with solar assisted thermal load considering renewable energy and price uncertainty," IEEE Transactions on Smart Grid, vol. 6, No. 1, pp. 301-314, 2014.

Ramanathan et al., "A framework for evaluation of advanced direct load control with minimum disruption," IEEE Transactions on Power Systems, vol. 23, No. 4, pp. 1681-1688, 2008.

Ruelens et al., "Residential demand response of thermostatically controlled loads using batch reinforcement learning," IEEE Transactions on Smart Grid, vol. 8, No. 5, pp. 2149-2159, 2016.

Schweppe et al., "Homeostatic utility control," IEEE Transactions on Power Apparatus and Systems, No. 3, pp. 1151-1163, 1980.

Strbac et al., "Demand side management: Benefits and challenges," Energy policy, vol. 36, No. 12, pp. 4419-4426, 2008.

Turner et al., "Peak load reductions: Electric load shifting with mechanical pre-cooling of residential buildings with low thermal mass," Energy, vol. 82, pp. 1057-1067, 2015.

U. E. I. Administration. (2015) Residential energy consumption survey. [Online]. Available: http://www.eia.gov/consumption/residential/ index.cfm.

Wei et al., "Air conditioner direct load control by multipass dynamic programming," IEEE Transactions on Power Systems, vol. 10, No. 1, pp. 307-313, 1995.

Zhang et al., "Aggregated modeling and control of air conditioning loads for demand response," IEEE transactions on power systems, vol. 28, No. 4, pp. 4655-4664, 2013.

* cited by examiner

METHODS, SYSTEMS, AND COMPUTER READABLE MEDIA FOR MODEL-FREE PRIVACY PRESERVING THERMAL LOAD MANAGEMENT

PRIORITY CLAIM

This application claims the benefit of U.S. Provisional Patent Application Ser. No. 63/067,282, filed Aug. 18, 2020, the disclosure of which is incorporated herein by reference in its entirety.

GOVERNMENT INTEREST

This invention was made with government support under CCF-1934904 and ECCS-1839616 awarded by National Science Foundation. The government has certain rights in the invention.

TECHNICAL FIELD

The subject matter described herein relates to thermal load management. More specifically, the subject matter relates to methods, systems, and computer readable media for non-intrusive thermal load management to reduce or minimize the cost of electricity procurement for a collection of electric consumers managed by an electric power aggregator.

BACKGROUND

In traditional power grids, uncertainties typically arise in the demand-side and are countered by an increase or decrease in the generation of power using operating reserves. The large-scale integration of renewables towards achieving a decarbonized grid has introduced additional uncertainties into the supply-side, due to the variability of renewable energy resources. Since generation from renewable energy resources cannot be directly controlled, this new uncertainty in the supply-side will need to be offset by tuning the demand in the grid via controllable loads. This approach, known as demand response, is a rapidly emerging operational paradigm in the modern power grid, wherein an aggregator or load serving entity (LSE) manages a collection of controllable loads that function as a new type of operating reserve, albeit one that is now on the demand-side.

Thermal inertial loads such as air conditioners (ACs), heaters and refrigerators comprise nearly half of the residential demand in the United States, and are attractive candidates for demand response due to their ability to store energy and alter (delay or advance) consumption without causing significant discomfort to the consumer. The exploitation of this demand response potential provides avenues for load serving entities to provide ancillary services to the grid, while simultaneously enabling consumers to reduce their individual energy costs by actively managing their thermal inertial loads.

SUMMARY

This document describes methods, systems, and computer readable media for thermal load management of a collection of power consumers managed by an electric power aggregator.

In some examples, a system includes a scheduling subsystem, implemented on one or more processors, configured for determining a plurality of cooling or heating control schedules for the collection of power consumers by forecasting one or more wholesale electricity price peaks. The system includes a control system implemented on one or more processors. The control system is configured for carrying out the cooling or heating control schedules at the individual consumer-level. The control system is configured for guaranteeing, for each power consumer of the collection of power consumers, a comfort constraint specified by a bilevel thermostat for the power consumer, wherein the comfort constraint comprises a lower bound temperature and an upper bound temperature that the power consumer is willing to tolerate.

The subject matter described herein can be implemented in software in combination with hardware and/or firmware. For example, the subject matter described herein can be implemented in software executed by a processor. In one example implementation, the subject matter described herein may be implemented using at least one computer readable medium having stored thereon computer executable instructions that when executed by the processor of a computer cause the computer to perform steps or operations. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DESCRIPTION

This document describes methods, systems, and computer readable media for thermal load management of a collection of power consumers managed by an electric power aggregator.

Figure 1:
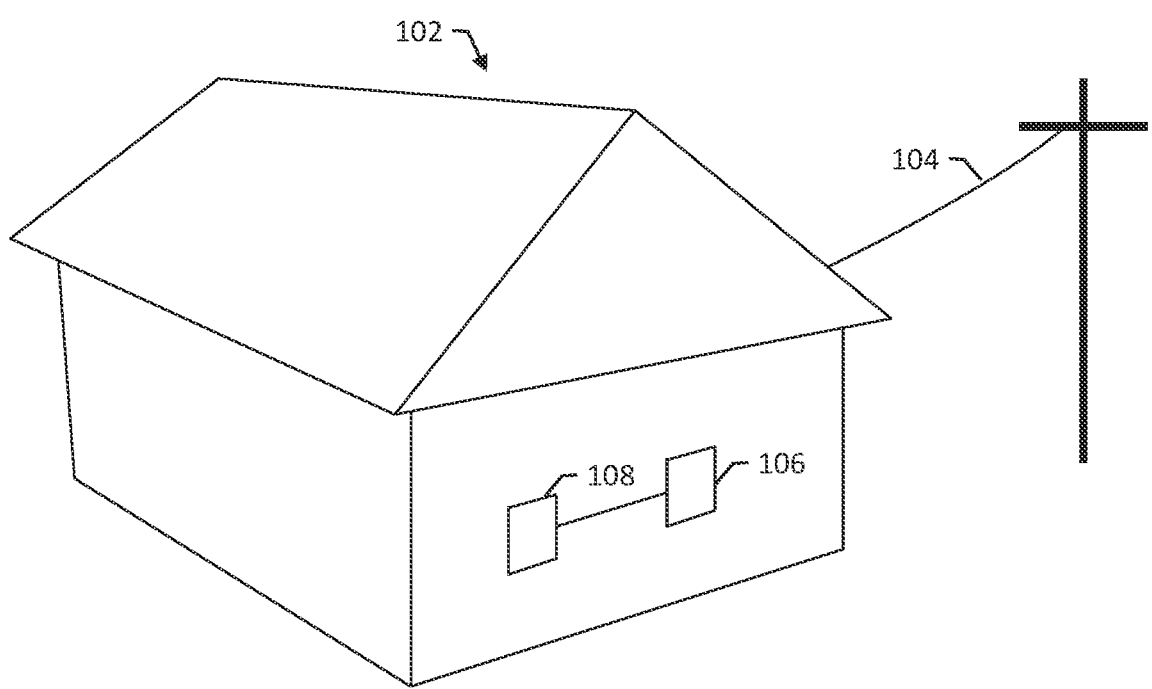
FIG. 1 is a diagram of an example residential electrical system.

FIG. 1 is a diagram of an example electrical system 102, e.g., for a residential building. The system 102 draws power at least from a connection 104 to a utility grid. The system 102 includes a control system 106 for a thermal load 108. The control system 106 can be a thermostat and the thermal load 108 can be an air conditioner.

Figure 2:
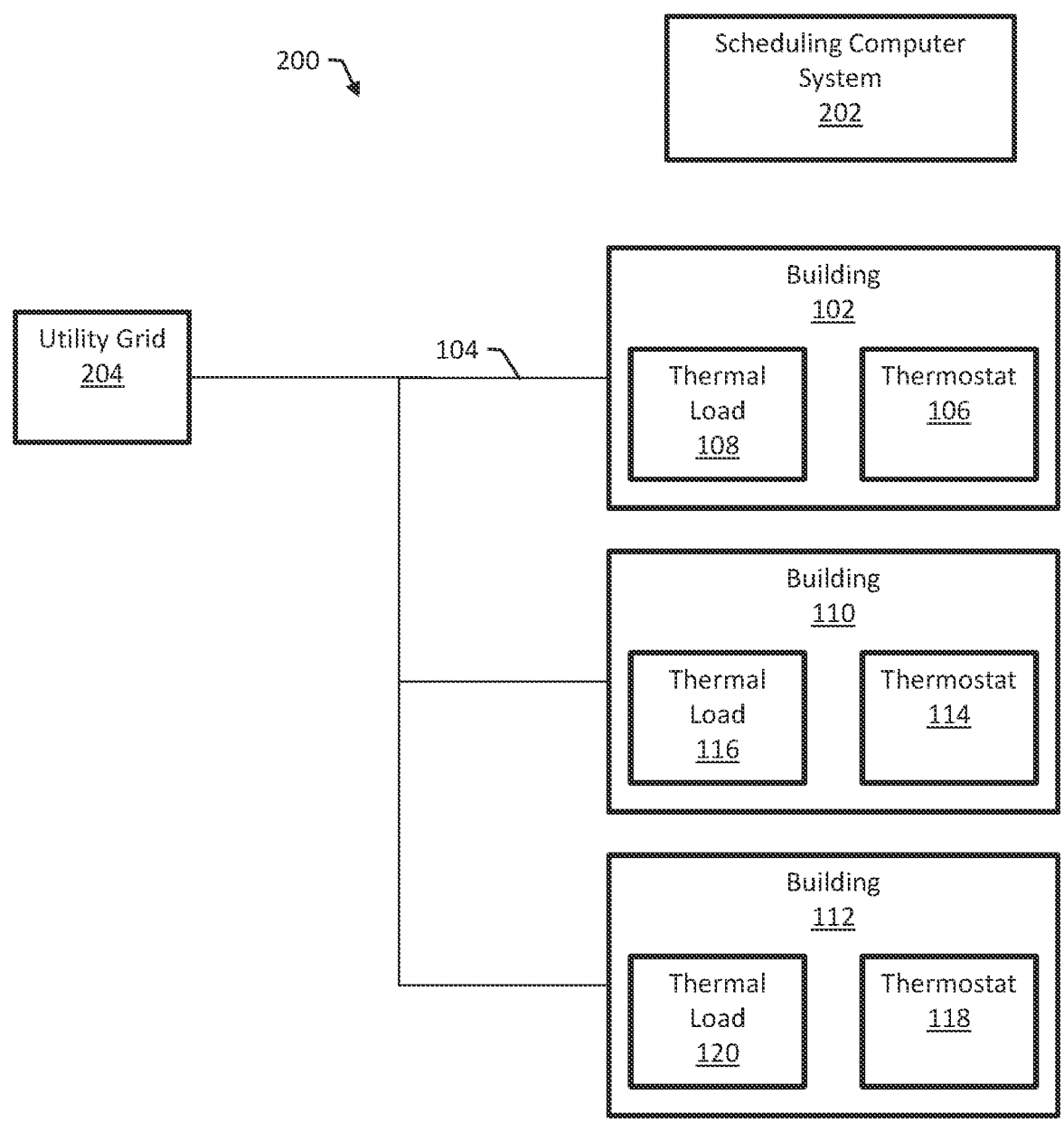
FIG. 2 is a block diagram of an example system for non-intrusive residential thermal load management.

FIG. 2 is a block diagram of an example system 200 for thermal load management of a collection of power consumers managed by an electric power aggregator.

As shown in FIG. 2, the collection of power consumers includes a number of buildings 102, 110, and 112. Each of the buildings has a respective thermal load 108, 116, and 120, which is typically an air conditioner. Each thermal load has a respective control system 106, 114, and 118, which is typically a thermostat. The thermal loads 108, 116, and 120 draw power from a utility grid 204 and possibly other sources of power such as solar panel systems or batteries.

The system 200 includes a scheduling computer system 202 implemented on one or more processors and operated by the electric power aggregator. The scheduling computer system 202 is configured for determining cooling or heating control schedules for the collection of power consumers by forecasting one or more wholesale electricity price peaks. The scheduling computer system 202 is configured for determining the cooling or heating control schedules without sensing or modeling of a plurality of buildings of the collection of power consumers. The scheduling computer system 202 is configured for minimizing the cost of electric power procurement for the electric power aggregator.

Each of the control systems 106, 114, and 118 is configured for carrying out the cooling or heating control schedules at the individual consumer-level and guaranteeing a comfort constraint specified by a bilevel thermostat for the power consumer. The comfort constraint includes a lower bound temperature and an upper bound temperature that the power consumer is willing to tolerate. Each of the control systems 106, 114, and 118 is configured for carrying out the cooling or heating control schedules without sharing temperature or power consumption measurements from the power consumers with the electric power aggregator.

For example, the scheduling computer system 202 may transmit the cooling or heating control schedules to the control systems 106, 114, and 118 over a computer network, e.g., the Internet. Each of the control systems 106, 114, and 118 can be connected to the network, e.g., via a WiFi connection. The control systems 106, 114, and 118 then transmit control commands to thermal loads 108, 1165, and 120, e.g., to turn on and turn off.

Examples of methods, systems, and computer readable media for thermal load management of a collection of power consumers managed by an electric power aggregator are described further below with reference to a study performed using the examples.

We consider the problem of optimizing the cost of procuring electricity for a large collection of homes managed by a load serving entity, by pre-cooling or pre-heating the thermal inertial loads in the homes to avoid procuring power during periods of peak electricity pricing. We would like to accomplish this objective in a completely privacy-preserving and model-free manner, that is, without direct access to the state variables (temperatures or power consumption) or the dynamical models (thermal characteristics) of individual homes, while guaranteeing personal comfort constraints of the consumers. We propose a two-stage optimization and control framework to address this problem. In the first stage, we use a long short-term memory (LSTM) network to predict hourly electricity prices, based on historical pricing data and weather forecasts. Given the hourly price forecast and thermal models of the homes, the problem of designing an optimal power consumption trajectory that minimizes the total electricity procurement cost for the collection of thermal loads can be formulated as a largescale integer program (with millions of variables) due to the on-off cyclical dynamics of such loads. We provide a simple heuristic relaxation to make this large-scale optimization problem model-free and computationally tractable. In the second stage, we translate the results of this optimization problem into distributed open-loop control laws that can be implemented at individual homes without measuring or estimating their temperatures or power consumption, while simultaneously ensuring consumer comfort constraints. We demonstrate the performance of this approach on a large-scale test case comprising of 500 homes, with electricity prices and temperature profiles drawn from the Houston area of the Electric Reliability Council of Texas (ERCOT) market.

I. Introduction

In traditional power grids, uncertainties typically arise in the demand-side and are countered by an increase or decrease in the generation of power using operating reserves. The large-scale integration of renewables towards achieving a decarbonized grid has introduced additional uncertainties into the supply-side, due to the variability of renewable energy resources. Since generation from renewable energy resources cannot be directly controlled, this new uncertainty in the supply-side will need to be offset by tuning the demand in the grid via controllable loads [1]-[3]. This approach, known as demand response, is a rapidly emerging operational paradigm in the modern power grid, wherein an aggregator or load serving entity (LSE) manages a collection of controllable loads that function as a new type of operating reserve, albeit one that is now on the demand-side [4].

Thermal inertial loads such as air conditioners (ACs), heaters and refrigerators comprise nearly half of the residential demand in the United States [5], and are attractive candidates for demand response due to their ability to store energy and alter (delay or advance) consumption without causing significant discomfort to the consumer [6][7]. The exploitation of this demand response potential provides avenues for load serving entities to provide ancillary services to the grid, while simultaneously enabling consumers to reduce their individual energy costs by actively managing their thermal inertial loads [8]-[11].

Early instances of demand response from thermal inertial loads typically employed coarse models of the duty cycles of the thermal loads to compute pre-defined load trajectories for curtailment during periods of peak pricing [12]-[14]. Subsequently, most approaches to thermal inertial management involve estimating the models and states of the loads, and utilizing this information to design and track a desired power trajectory that minimizes costs or provides operational support to the grid [15]-[22]. The disruption of end-user functions due to demand response has also been incorporated into the scheduling of thermal loads, either by modeling it as an average 'off-time' [23][24], or by incorporating it explicitly as a constraint in the problem of designing the optimal power trajectory for the collection of loads [25]-[31].

In this context, it is desirable to develop model-free privacy-preserving approaches for thermal inertial load management, for three reasons. First, thermal models can be used to infer information about the size, layout and construction of the consumers' homes, which may constitute a violation of consumer privacy. Second, it is challenging to obtain such models for demand response programs involving largescale participation from thousands of homes, even with intrusive measurement and monitoring. Finally, for privacy reasons, it is not desirable to measure the temperatures or power consumption of individual homes. Recently, learning based model-free approaches for the optimization and control of thermal loads have been proposed [32]-[34]; however, these approaches are typically not privacy-preserving in that they still involve measuring the internal temperatures and power consumption profiles of homes. Alternatively, privacy preserving approaches to thermal inertial load management, wherein the power consumption of individual homes is not directly measured have been proposed [25][26][35]. However, all of these approaches still utilize models of the thermal loads in the computation and implementation of optimal control actions for electricity cost minimization. Our aim is to bridge this gap by proposing a model-free privacy-preserving approach for the management of thermal inertial loads.

Specifically, we consider the problem of minimizing the cost of procuring electricity for a large collection of homes managed by a load serving entity. The objective is to pre-cool (or pre-heat) homes by controlling residential thermal loads, in order to avoid procuring power during periods of peak electricity pricing. Further, we would like to accomplish this objective in a completely privacy-preserving and model-free manner, that is, without direct access to the state variables (temperatures and power consumption) or models (thermal characteristics) of individual homes.

We propose a two-stage optimization and control framework to address this problem. In the first stage, we use a long-short term memory (LSTM) based recurrent neural network architecture to forecast hourly electricity prices from historical price data and weather forecasts. Given the hourly price forecast and the thermal models of the homes, the problem of designing an optimal power consumption trajectory that minimizes the total electricity procurement cost can be formulated as a large-scale integer program (with millions of variables) due to the on-off cyclical dynamics of such loads. This integer program has typically been solved using linear relaxations or dynamic programming [25][27], with explicit closed-form solutions available in special cases where prices are assumed to be monotone [36]. Here, we propose a simple heuristic relaxation to convert this largescale optimization problem into a model-free optimization problem that can be solved in an explicit and computationally tractable manner. In the second stage, we translate the results of this optimization problem into distributed openloop control laws that can be implemented at the individual homes without measuring or estimating their state variables, while respecting consumer comfort constraints. We demonstrate the performance of this approach on a large-scale test case comprising of 500 homes with pricing data from the Houston area of the Electric Reliability Council of Texas (ERCOT) market.

Notation: $\mathbb{R}$, $\mathbb{R}_+$, and $\mathbb{Z}$ denote the sets of real numbers, positive real numbers including zero, n-dimensional real vectors, and integers respectively.

Given $a, b \in \mathbb{R}$, $a \wedge b = \begin{cases} a, & a < b \\ b, & a > b \end{cases}$ and $a \vee b = \begin{cases} a, & a > b \\ b, & a < b \end{cases}$.

Given two sets A and B, A\B represents the set of all elements of A that are not in B. We denote the Laplace density function with zero mean and scale parameter $a \in \mathbb{R}_+\setminus\{0\}$ by Lap(a). The gamma density function with parameters a, $b \in \mathbb{R}_+\setminus\{0\}$ is denoted by $\Gamma$(a, b) and the exponential density function with rate $\lambda \in \mathbb{R}_+\setminus\{0\}$ is denoted by Exp($\lambda$). We denote by $\mathcal{N}(\mu, \sigma, a, b)$ truncated univariate Gaussian density function with mean $\mu$, standard deviation $\sigma$ and support [a, b].

II. Problem Formulation

In this section, we begin by describing the model of a collection of residential thermal loads, and formulate the problem of minimizing the electricity procurement cost. For simplicity, we assume that all thermal loads are air conditioners (ACs). Note that the same analysis can be carried out for heaters, with the objective of pre-heating homes rather than pre-cooling them.

A. System Model

Consider a population of N homes with controllable ACs managed by a load serving entity (LSE). Assume that each home has a temperature set point that is private to the consumer, denoted by $s_i$, and a comfort range $\Delta_i$, $i \in \{1, 2, \ldots, N\}$, which denotes the deviation from the set point that each consumer is willing to tolerate. Therefore, the temperature of the i-th home at any time $t \in \mathbb{R}_+$, denoted by $\theta_i(t)$, must lie in the comfort band $[L_{i0}, U_{i0}] = [s_i - \Delta_i, s_i + \Delta_i]$. The flexibility of the i-th consumer, $i \in \{1, 2, \ldots, N\}$, can be quantified by the range of the consumer's comfort band, that is $2\Delta_i$. The temperature dynamics of the i-th home, $i \in \{1, 2, \ldots, N\}$, is governed by $$\dot{\theta}_i(t) = \alpha_i(\theta_i(t) - \theta_\alpha(t)) - \beta_i P_i \sigma_i(t), \quad (1)$$

where $\theta_\alpha(t)$ represents the ambient temperature at time $t \in \mathbb{R}_+$, $P_i$ represents the power consumption of the i-th AC, $\alpha_i$ and $\beta_i$ represent the heating time constant (h$^{-1}$) and thermal conductivity (° C./kWh) of the i-th home, and $\sigma_i(t) \in \{0, 1\}$ denotes the ON/OFF state of the i-th AC at time where $t \in \mathbb{R}_+$, where $\sigma_i(t) = 1$ indicates that the AC is ON and $\sigma_i(t) = 0$ indicates that the AC is OFF. When the AC is OFF, the temperature of the home rises until it reaches the upper bound of the consumer's comfort band $U_{i0}$, at which point the AC turns ON. Similarly, when the temperature reaches the lower bound of the comfort band, $L_{i0}$, the AC turns OFF. Therefore, the switching behavior of the i-th AC, $i \in \{1, 2, \ldots, N\}$, can be defined as $$\sigma_i(t) = \begin{cases} 1, & \theta_i(t) = U_{i0} \\ 0, & \theta_i(t) = L_{i0} \\ \sigma_i(t^-), & \text{otherwise} \end{cases} \quad (2)$$

The total electrical power consumed by the population of ACs is given by $$P_{total} = \sum_{i=1}^{N} \frac{P_i}{\eta_i},$$

where $\eta_i$ is the coefficient of performance of the i-th AC.

B. Optimization Problem

Define the indicator variable $u_i(t): \mathbb{R}_+ \to \{0, 1\}$, $\forall i \in \{1, 2, \ldots, N\}$ where $u_i(t) = 1$ if the i-th AC is ON at time $t \in \mathbb{R}_+$, and $u_i(t) = 0$ otherwise. We also denote the total number of ACs that are ON at any time $t \in \mathbb{R}_+$ by $n_{ON}(t)$. For simplicity, we assume without loss of generality that all the ACs have an identical power consumption and coefficients of performance, that is, $P_i = P$ and $\eta_i = \eta$, $\forall i \in \{1, 2, \ldots, N\}$. Let the electricity price forecast and ambient temperature forecast at time $t \in \mathbb{R}_+$, be denoted by $\hat{\pi}(t): \mathbb{R}_+ \to \mathbb{R}_+$ and $\hat{\theta}_\alpha(t): \mathbb{R}_+ \to \mathbb{R}$ respectively. If these forecasts are known over a T-hour horizon, that is, $\forall t \in [0, T]$, $T \in \mathbb{R}_+\setminus\{0\}$, then, the problem of minimizing the total cost of procuring electricity by the LSE for the collection of ACs over the time horizon [0, T] can be formulated as $$\mathcal{P}: \min_{u_1(t),\ldots,u_N(t) \in \{0,1\}^N} \frac{P}{\eta} \int_0^T \hat{\pi}(t) \sum_{i=1}^N u_i(t) dt \quad (3)$$

s.t. $\dot{\theta}_i(t) = -\alpha_i(\theta_i(t) - \hat{\theta}_a(t)) - \beta_i P u_i(t)$ $$\frac{P}{\eta} \int_0^T \sum_{i=1}^N u_i(t) dt \le E$$

$L_{i0} \le \theta_i(t) \le U_{i0}$, where E>0 is the maximum energy budget of the LSE for the time horizon [0, T].

Assumption 1: We make the following assumptions pertaining to the feasibility of the optimization problem P.

We assume that the price and ambient temperature forecasts $\hat{\pi}_i(t)$ and $\hat{\theta}_\alpha(t)$ are continuously differentiable functions of time t.

Without loss of generality, we assume that the initial temperatures are within the user's comfort constraints, that is, $\theta_i(0) \in [L_{i0}, U_{i0}]$.

For every $i \in \{1, 2, \ldots, N\}$, when the states are at the upper or lower bound of the comfort band $[L_{i0}, U_{i0}]$, there exists a control policy that can maintain the state inside the comfort band. In other words, the dynamics (1) are such that for all possible $\hat{\theta}_i(t)$, the temperature $\theta_i(t)$ increases with $\sigma_i(t)=0$, and decreases with $\sigma_i=1$, or $\forall t \in \mathbb{R}_+$ and $i \in \{1, 2, \ldots, N\}$, $-\alpha_i(L_{i0}-\hat{\theta}(t))>0$, $-\alpha_i(U_{i0}-\hat{\theta}(t))-\beta_i<0$. Note that the control inputs to maintain the temperature at the upper or lower comfort bounds are given by $$u_i^{UP}(t) = \frac{\alpha_i}{\beta_i}(\theta_i(t) - U_{i0}) \text{ and } u_i^{DOWN}(t) = \frac{\alpha_i}{\beta_i}(\theta_i(t) - L_{i0})$$

respectively.

C. Problem Statement

We now state the problem addressed herein. Problem: Given historical hourly data of electricity prices and ambient temperatures, as well as the ambient temperature forecast $\hat{\theta}_\alpha(t)$ over a time horizon [0, T], the aim is to (i) solve optimization problem P without explicit knowledge of the values of the thermal parameters and $\alpha_i$ and $\beta_i$, $i \in \{1, 2, \ldots, N\}$ in (3), and (ii) design $\sigma_i(t)$, $i \in \{1, 2, \ldots, N\}$ that results in the optimal power consumption determined by the solution of (3) when implemented locally at each AC $i \in \{1, 2, \ldots, N\}$, without access to the state variables $\theta_i(t)$ or $\alpha_i(t)$ and power consumption $P_i(t)$ or $P_{total}(t)$ by the LSE.

III. Model-Free Privacy-Preserving Optimization and Control Framework

In this section, we present a two-stage approach to solve the problem considered in Section II-C. In the first stage, we begin by forecasting hourly electricity prices based on historical price data and ambient temperature forecasts. We then propose a heuristic relaxation to solve the optimization problem P in a model-free manner. In the second stage, we discuss control laws for the implementation of this solution.

A. Stage 1: Optimization

We begin by describing how the price forecast $\hat{\pi}(t)$ can be obtained from historical data.

1) LSTM-based Price Forecasting: Given the ambient temperature forecast $\hat{\theta}_\alpha(t)$ over the horizon $t \in [0, T]$, we begin by using a long short-term memory (LSTM) neural network to forecast the hourly electricity price $\hat{\pi}(t)$, $t \in [0, T]$. We choose to use an LSTM-based prediction, since its memory structure allows us to capture features like seasonal and daily variations in prices, as well as denoise historical data. Real-time electricity prices vary rapidly on a minute by-minute basis. However, significant variations are typically observed at the hourly level, and most procurement by the LSE is also carried out at this time scale. Therefore, we begin by averaging intra-hourly historical data to obtain hourly electricity price data on each day, over a period of several years. Similarly, we obtain historical temperature data on an hourly time scale. These hourly price and temperature datasets serve as the inputs to the LSTM.

Remark 1: The window of prediction for the LSTM is chosen based on two considerations. First, in our simulations, we determined that highly accurate price predictions can be made in short time windows of less than four hours. Second, we require that the prediction window is larger the sum of two time windows $T_{ON}$ and $T_{OFF}$, defined as follows:

$T_{ON}$: the average time required to cool down a home from its upper comfort bound to its lower comfort bound, that is, the average over all ACs $i \in \{1, 2, \ldots, N\}$ of the smallest amount of time $T_{ON,i}$ such that $\theta_i(0)=U_{i0}$ and $\theta_i(T_{ON,i})=L_{i0}$, and $T_{OFF}$: the average 'duty cycle' of the residential thermal loads, that is, the average over all ACs $i \in \{1, 2, \ldots, N\}$ of the smallest amount of time $T_{OFF,i}$, such that $\theta_i(T_{OFF})=U_{i0}$, given that $\theta_i(0)=L_{i0}$ and $\sigma_i(t)=0$, $\forall t \in [0, T_{OFF,i}]$.

This is to account for the fact that decisions to pre-cool a home will need to be taken at least (TON+TOFF) amount of time before price peaks for a feasible implementation.

LSTM Case Study: We now illustrate the performance of the LSTM-price forecasting on a dataset comprising of (i) real-time electricity price data for Houston, Texas (LZ-HOUSTON node) at 15-min intervals over a period of 7 years ranging from 2013-2019, available from the Electric Reliability Council of Texas (ERCOT) at http://www.ercot.com/mktinfo/prices, and (ii) hourly historical weather data, available from the National Centers for Environmental Information at https://www.ncdc. noaa.gov/cdo-web/data-tools. We begin by averaging the 15-min prices from the ERCOT dataset to obtain the average hourly historical prices. We note that the forecasting, optimization and control framework proposed herein is not restricted to intra-day markets, and can be readily applied to day-ahead electricity markets. After suitably scaling the temperature and hourly price datasets, we separate them into training and test data sets, where the training data set comprises of all price and temperature information for the years 2013-2017, and the test data set comprises of the same information for the years 2018-2019. We then implement an LSTM network comprised of one hidden layer with 5 LSTM neurons using Keras (https://keras.io). Based on the considerations described in Remark 1, we choose a forecast window of 3 hours. The network was found to converge in 10 epochs, with a mean absolute error (MAE) of 4.06%.

Figure 3A:
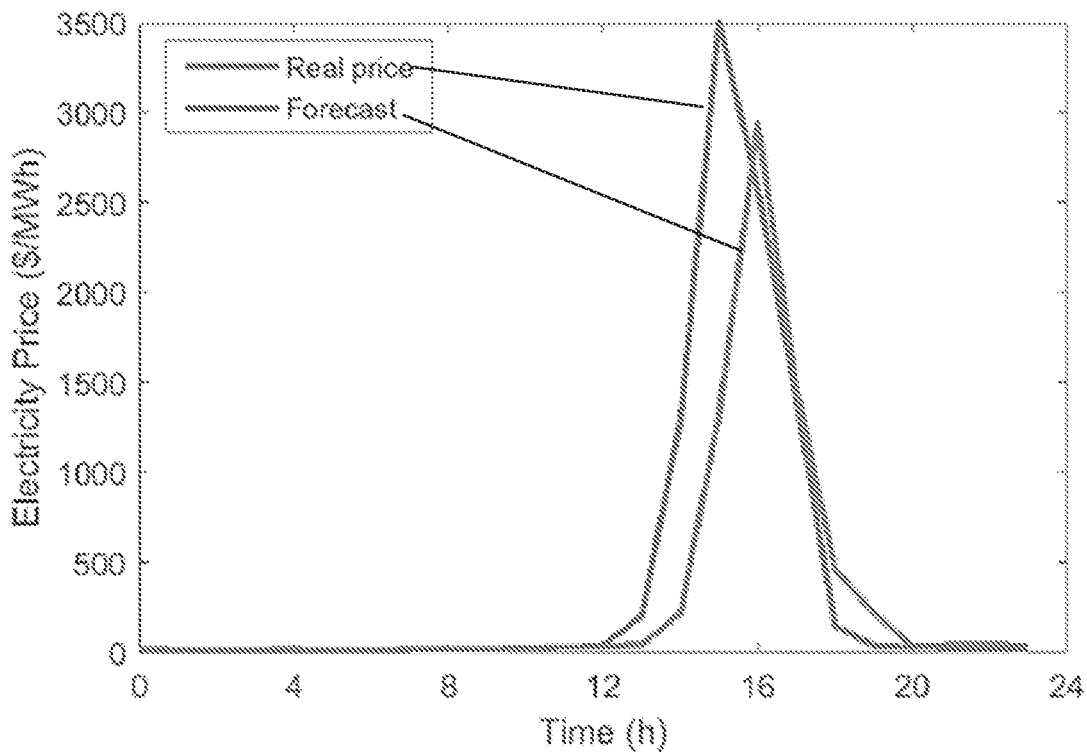
FIGS. 3A-3B are graphs slowing a comparison of real prices vs. forecast for historically unusual (worst-case) scenarios from ERCOT data.
Figure 3B:
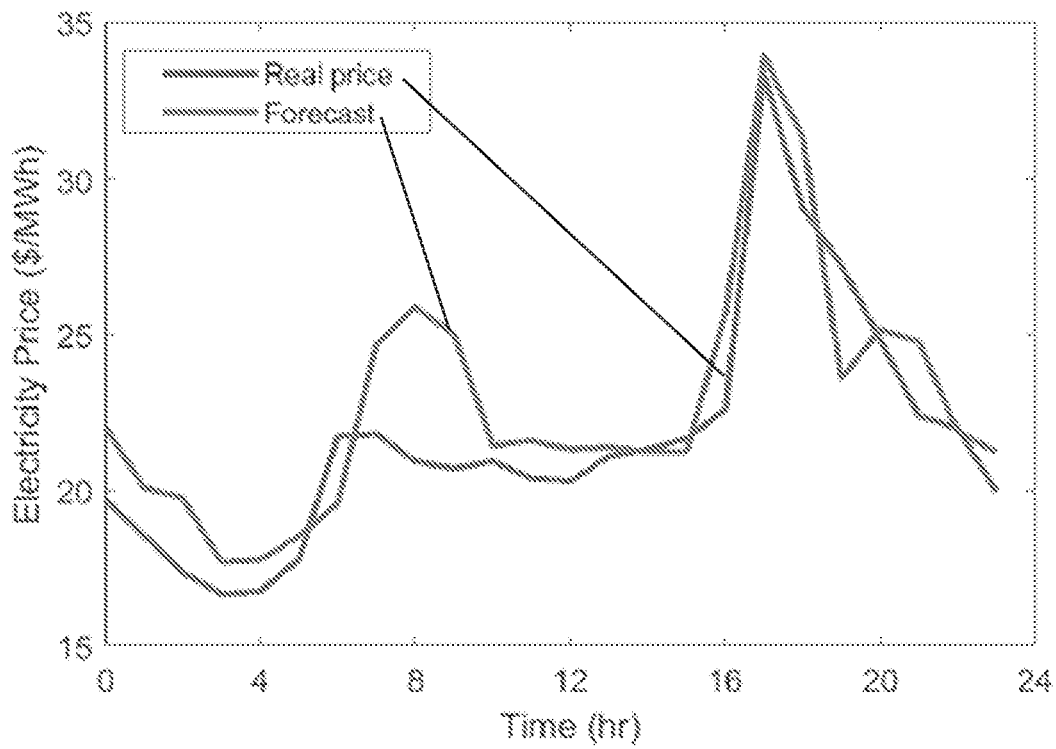

We now highlight two interesting cases pertaining to pricing data on 29 Aug. 2019 and 31 Dec. 2019, where historically unusual peak prices or profiles were observed in the Houston area, as shown in FIGS. 3A and 3B.

FIGS. 3A-3B are graphs slowing a comparison of real prices vs. forecast for historically unusual (worst-case) scenarios from ERCOT data. FIG. 3A shows data from Aug. 29, 2019, and FIG. 3B shows data from Dec. 31, 2019.

These cases represent the worst-case scenarios for our LSTM-based forecast. From FIGS. 3A-3B, we see that the LSTM network is successful in predicting the price trends, and more importantly, the time at which peak prices occur, an aspect that will later be crucial to our proposed optimization algorithm.

2) Model-free Optimization: In order to solve the optimization problem P without knowledge of the dynamics of individual homes, we begin by making an assumption about the price forecast $\hat{\pi}(t)$, $t \in [0, T]$.

Assumption 2: We assume that the price forecast $\hat{\pi}(t)$ is unimodal over $t \in [0, T]$, that is, there exists $t_{PEAK} \in [0, T]$, such that $\hat{\pi}(t)$ is monotonically increasing $\forall t \leq t_{PEAK}$, and monotonically decreasing $\forall t > t_{PEAK}$.

Figure 4:
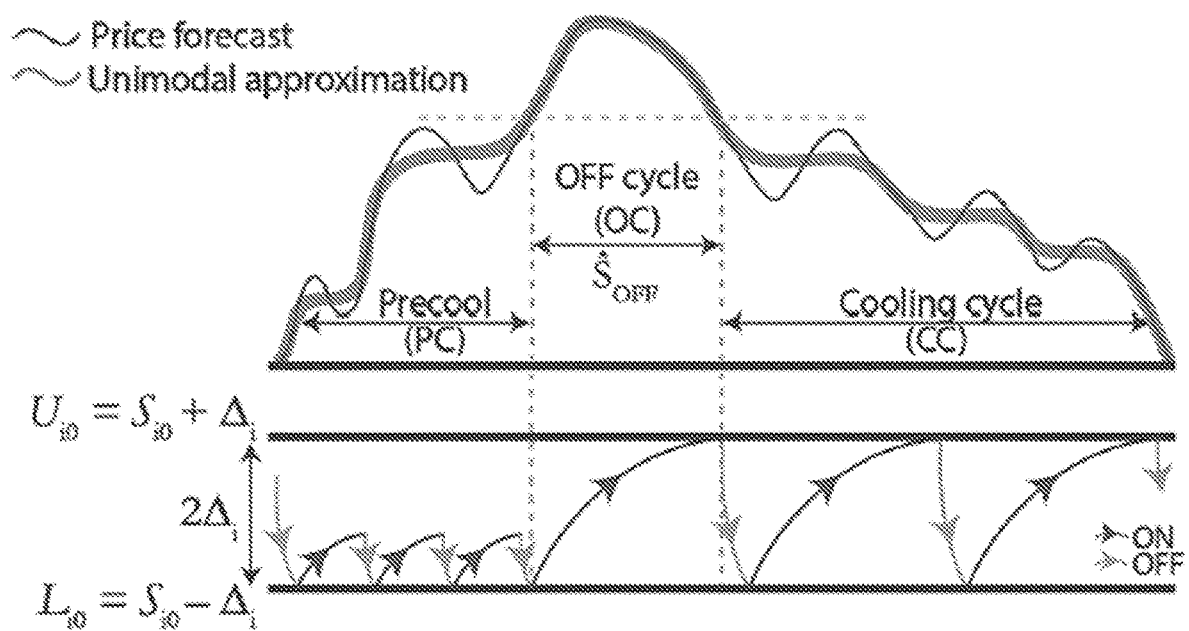
FIG. 4 is a schematic of the optimization and control framework, indicating periods of pre-cooling (PC), OFF time (OC), and normal cyclical cooling operation (CC)

This assumption is not unreasonable since historical data indicates a strong unimodality property in hourly electricity prices, typically correlated with hourly variations in temperature and load profiles over the day, thus allowing for the electricity price forecast $\hat{\pi}(t)$ to be closely approximated by a unimodal function as illustrated in FIG. 4. FIG. 4 is a schematic of the optimization and control framework, indicating periods of pre-cooling (PC), OFF time (OC), and normal cyclical cooling operation (CC).

We now propose a simple heuristic relaxation to the optimization problem P, based on Assumption 2. If $\hat{\pi}(t)$ is unimodal, then, an explicit solution to (3) can be written down as follows. Intuitively, the optimal solution to (3) involves designing $u_i(t)$ such that the LSE purchases most of its power during the period when the price is low, and uses this energy to pre-cool homes to their lower comfort bound $L_{i0}$, allowing for the ACs to be switched off during the peak pricing period until the temperature reaches the upper comfort band $U_{i0}$. For this pre-cooling operation, we consider the monotonically increasing portion of the the unimodal price function, that is $\hat{\pi}(t)$ such that $t \in [0, t_{PEAK}]$. Additionally, we relax the energy budget constraint by assuming $E=\infty$ (An explicit model-based solution to (3) incorporating this constraint and the switching dynamics of the loads can be provided along the lines of [36]). We have the following result on the solution to the optimal control problem P for the period where the price is monotonically increasing.

If $\hat{\pi}(t)$, $t \in [0, t_{PEAK}]$ is monotonically increasing, then there exists $t^* < t_{PEAK}$, such that the optimal solution to (3) is given by $$u_i^*(t) = \begin{cases} 1, & t < t^*, \quad \theta_i \in (L_{i0}, U_{i0}] \\ u_i^{DOWN}(t), & t < t^*, \quad \theta_i = L_{i0} \\ u_i^{UP}(t), & t \geq t^*, \quad \theta_i = U_{i0} \\ 0, & t \geq t^*, \quad \theta_i \in [L_{i0}, U_{i0}) \end{cases} \quad (5)$$

where $u_i^{UP}$ and $u_i^{DOWN}$ are as defined in Assumption 1.

In order to apply this result to solving (3) with a unimodal price forecast $\hat{\pi}(t)$, $t \in [0, t_{PEAK}]$ satisfying Assumption 2, it is first necessary to determine the pre-cooling period, denoted by PC=[0, t*] as shown in FIG. 4 such that $u_i(t^*)=u_i^{DOWN}(t^*)$ and $\theta_\alpha(t^*)=L_{i0}$. We begin by noting that we would like to maintain $u_i=0$ for as long as possible around the peak pricing period, without violating consumers' comfort bounds. We denote this period where $u_i=0$ as the OFF cycle (OC) with duration $\hat{S}_{OFF}$. The longest period for which the OFF cycle can be maintained is the average duty cycle $T_{OFF}$ as defined in Remark 1, that is $\hat{S}_{OFF}=T_{OFF}$. Working backwards, we can approximate $t^* \approx t_{PEAK}-T_{OFF}/2$. We can then make the following statement with respect to the solution to the optimization problem (3) during the pre-cooling period and the OFF-cycle.

If $\hat{\pi}(t)$ is monotonically increasing for $t \in [0, t_{PEAK}]$ and monotonically decreasing for $t \in [t_{PEAK}, T]$ then the solution to (3) for $t \in [0, t_{PEAK}+T_{OFF}/2, T]$ is given by (5) with $t^* \approx t_{PEAK}-T_{OFF}/2$.

After the OFF cycle, the price $\hat{\pi}(t)$, $t \in [t_{PEAK}+T_{OFF}/2, T]$ is assumed to be monotonically decreasing according to Assumption 2. During this period, two types of control actions are possible as follows:

Option 1: Maintain $\theta_i(t)=U_i(t)$ for $t \in [t_{PEAK}+T_{OFF}/2, T]$, or

Option 2 (cooling cycle or CC): Allow the collection of ACs to evolve according to their natural dynamics (1) with control action (2).

In our approach, we choose the latter, namely Option 2, for two reasons. First, Option 2 allows for greater comfort for residential consumers by maintaining the average temperature of the home closer to the setpoint of the consumer's choice. Second, since the ambient temperatures during this period are typically cooler, it may not be optimal to maintain the temperature at the upper comfort bound $U_{i0}$.

In summary, we solve the optimization problem P by dividing the day into three time horizons, namely, precooling, OFF cycle and cooling cycle, for which the control actions $u_i^*(t)$ are determined from (5).

Remark 2: We make the following remarks about the proposed solution to the optimization problem P.

We note that $T_{OFF}$ for a given ambient temperature profile can be very easily inferred by observing the total load profile over a day, without any direct knowledge of the dynamics (thermal parameters) of the homes. Therefore, the solution to (3) can be constructed in a completely model-free manner.

This solution relies on an accurate forecast of $t_{PEAK}$, which is obtained using the LSTM network described above. Note that the actual magnitude of the peak price is not important to our approach. Therefore, while prediction errors in the price magnitude can be tolerated, it is critical that the LSTM network be tuned such that the time of peak pricing is predicted as accurately as possible.

B. Stage 2: Private Control Implementation

We now describe how the solution of the optimization problem P as discussed above and depicted in FIG. 4 can be implemented in a private and distributed manner at each home, without any measurement of the state (temperature and power consumption) of the home by the LSE. At any time $t \in [0, T]$, the LSE broadcasts one of the following commands to the ACs:

$$c(t) = \begin{cases} 1, & t \in [0, t_{PEAK} - T_{OFF}/2] \\ 0, & t \in [t_{PEAK} - T_{OFF}/2, t_{PEAK} + T_{OFF}/2] \\ CC, & t \in [t_{PEAK} + T_{OFF}/2, T] \end{cases}$$

The ACs then translate these commands into their private switching state $\sigma_i(t)$, $i \in \{1, 2, \ldots, N\}$, at each time $t \in [0, T]$ as follows:

$$\sigma_i(t) = \begin{cases} 1, & c(t) = 1, \quad \theta_i(t) \in (L_{i0}, U_{i0}] \\ u_i^{DOWN}(t), & c(t) = 1, \quad \theta_i(t) = L_{i0} \\ 0, & c(t) = 0, \quad \theta_i(t) \in [L_{i0}, U_{i0}) \\ u_i^{UP}(t), & c(t) = 0, \quad \theta_i(t) = U_{i0} \\ \sigma(t^-), & c(t) = CC, \quad \theta_i(t) \in (L_{i0}, U_{i0}) \\ 1, & c(t) = CC, \quad \theta_i(t) = U_{i0} \\ 0, & c(t) = CC, \quad \theta_i(t) = L_{i0} \end{cases}$$

Note that the control actions (7) can be implemented in an extremely simple manner without any measurements being transmitted to the LSE. The only requirement is that the homes be equipped with a smart thermostat that can receive instructions broadcast by the LSE. We note that the control inputs $u_i^{DOWN}(t)$ and $u_i^{UP}(t)$ in (7) to maintain a particular temperature $\theta_i(t)$ once the home has cooled to its setpoint are also already present as an energy saving measure in most ACs, where they are implemented by turning off the compressor of the AC and do not require knowledge of the thermal parameters of the home.

IV. Case Study

Figure 5A:
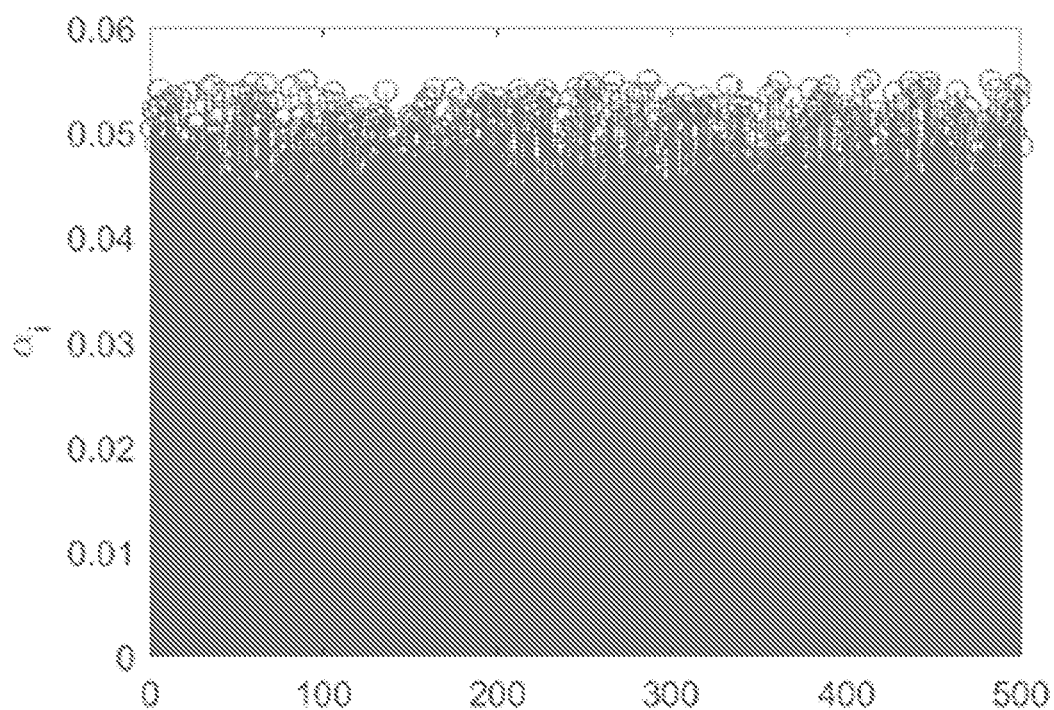
FIGS. 5A-5C are graphs illustrating thermal characteristics of ACs.
Figure 5B:
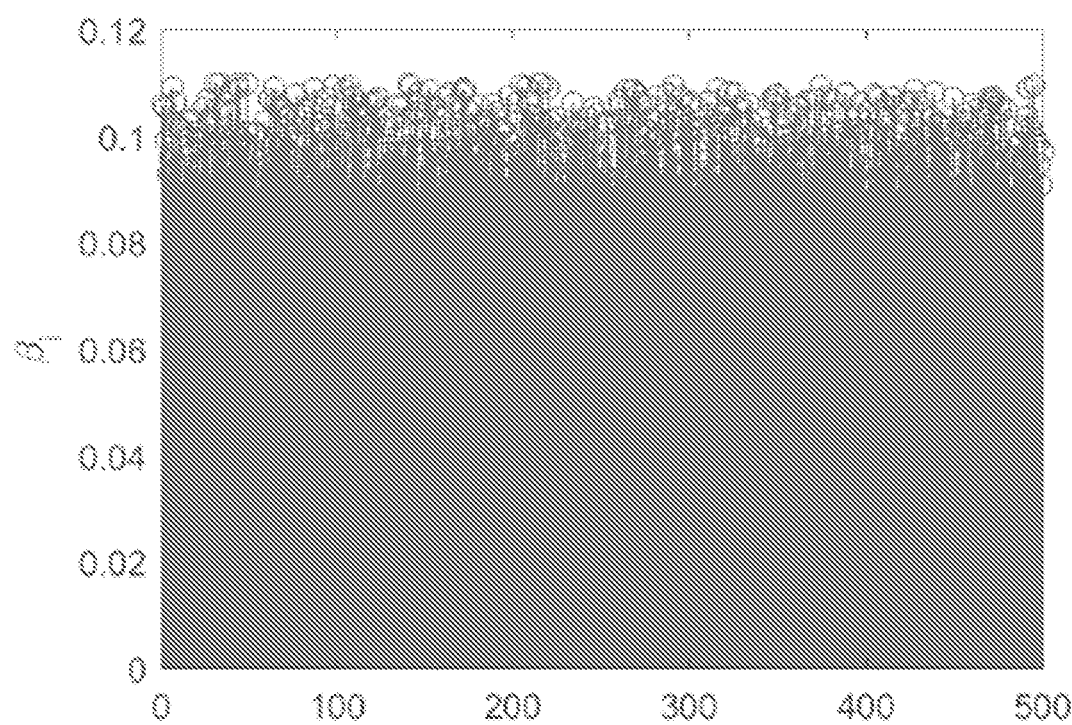
Figure 5C:
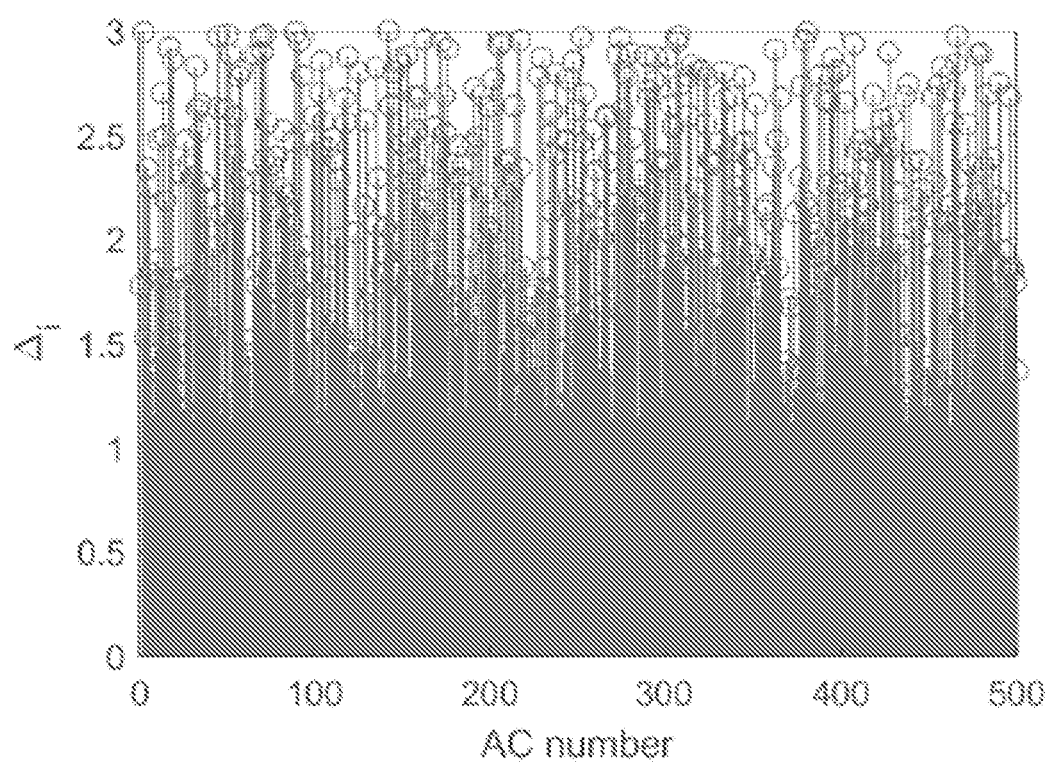

In this section, we demonstrate the application of the optimization and control framework proposed in Section III on a test with 500 homes, wherein the price profiles are assumed to be from the LZ-HOUSTON node of the ERCOT market. We consider N=500 ACs with thermal power P=14 kW; and efficiency η2:5, with thermal parameters and $\alpha_i$ and $\beta_i$, i=1, 2, . . . , N drawn from the truncated Gaussians $\alpha \sim \mathcal{N}(\mu_\alpha, 0.1\mu_\alpha, 0.9\mu_\alpha, 1.1\mu_\alpha)$ and $\beta \sim \mathcal{N}(\mu_\beta, 0.1\mu_\beta, 0.9\mu_\beta, 1.1\mu_\beta)$ respectively, where $$\mu_\alpha = \frac{1}{RC}h^{-1}, \mu_\beta = \frac{1}{C}° \text{C./kWh, and } R = 2° \text{ C./kW and}$$
$$C = 10 \text{ kWh/° C.}$$

represent the thermal resistance and capacitance of the ACs respectively. We assume that the comfort bands of the ACs $\Delta_i$ are uniformly distributed in the range [1, 3]° C. The thermal parameters and comfort bands of all homes are shown in FIGS. 5A-5C. FIGS. 5A-5C are graphs illustrating thermal characteristics of ACs.

Figure 6A:
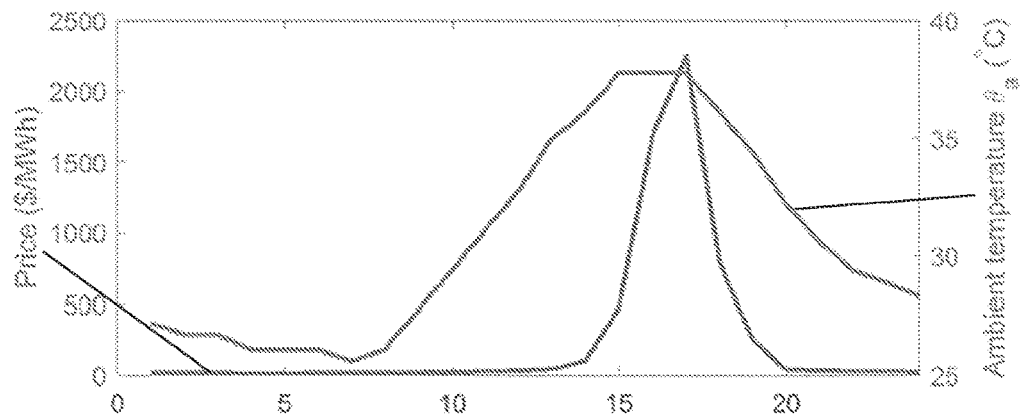
FIGS. 6A-6C are graphs illustrating price, power, and temperature data.

As described in the LSTM case study above, we begin by forecasting the hourly price given historical price data and the ambient temperature profile as shown in FIG. 6A. We then compute the solution to the optimal control problem (3) using the approach in Section III, compute the control commands broadcast by the LSE according to (6) and implement the corresponding switching actions (7) at each time t∈ [0, T].

We simulate the response of the homes to the control scheme by solving (1) with switching action (7) over a horizon of T=24 h by discretization using the Euler method with a step size of 1 second, and compute the total power consumption at each time step. FIG. 6C shows the temperature profiles of the homes with the model-free control scheme, clearly satisfying consumer comfort constraints. We observe that the ACs are pre-cooled from t∈ [0, 16] h and are turned off during the period of peak pricing between t∈ [16, 17.5] h. It can be verified that this OFF cycle aligns with the average duty cycle of the ACs computed from $\alpha_i$ and $\beta_i$, {1, 2, . . . , N}.

Figure 6B:
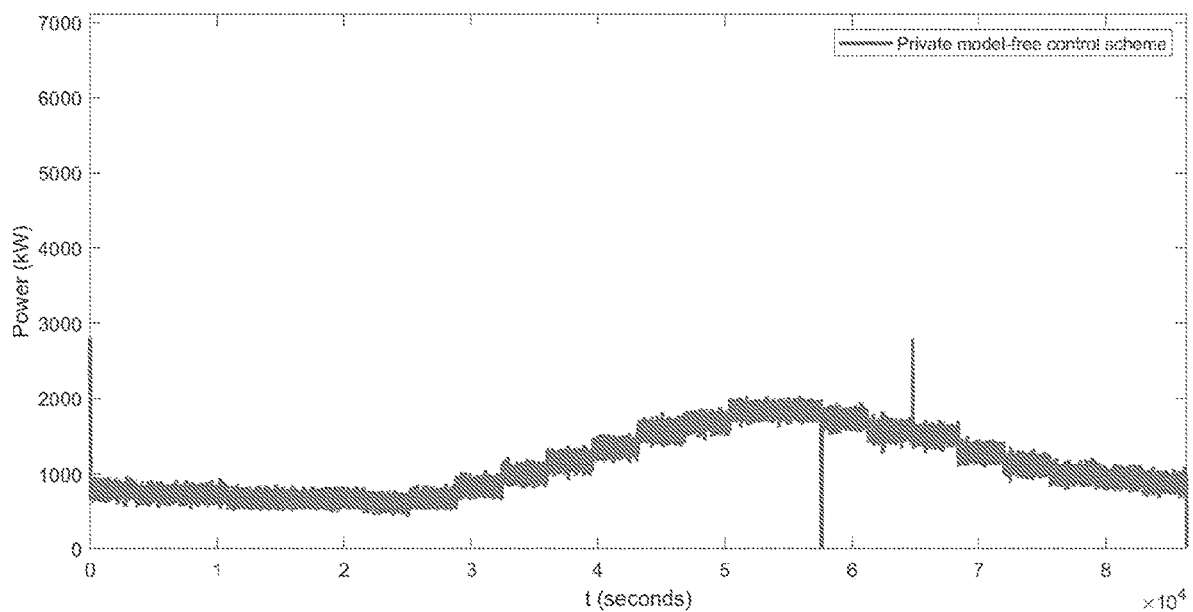
Figure 6C:
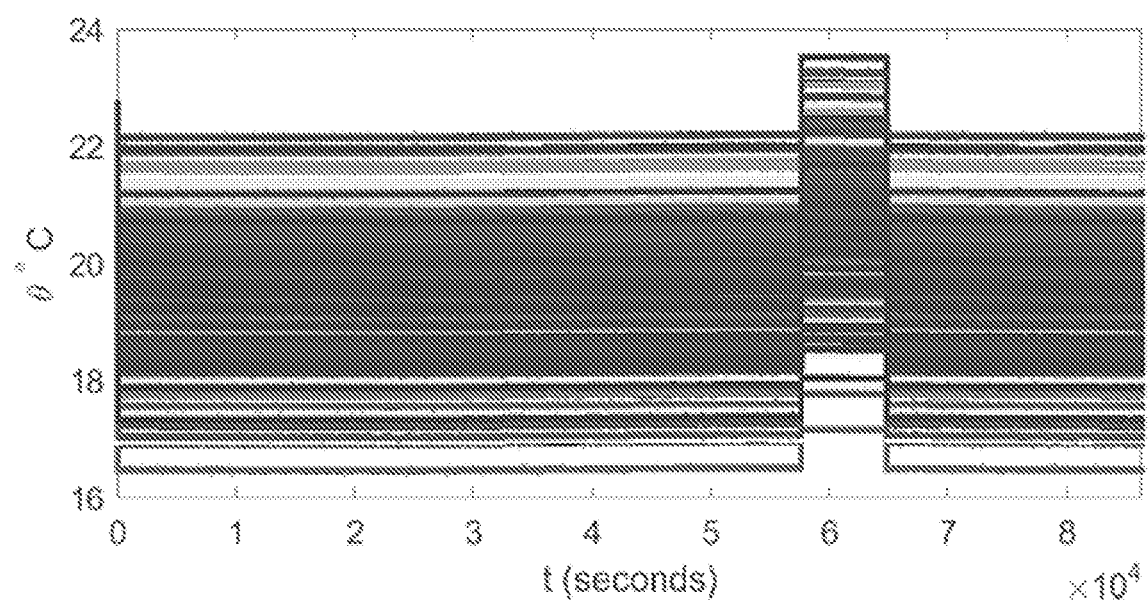

The total power consumption under the model-free control scheme is shown in FIG. 6B. The average energy consumption $E_{avg}$ and energy cost savings $E_s$ over the day for the model-free control scheme as compared to the scenario without optimal control are found to be as follows:

Uncontrolled: $E_{avg}$=25.68 MWh, $E_s$=0
Model-free: $E_{avg}$=23.0 MWh, $E_s$=$3597.

Clearly, the proposed model-free method results in significant cost savings, while providing the added advantages of being completely privacy-preserving for the consumer, and being amenable to a simple model-free implementation, indicating its potential in thermal inertial load management.

V. Conclusion

We proposed a model-free framework to minimize the cost of procuring electricity for a collection of residential thermal loads by pre-cooling them to avoid purchasing power during peak pricing periods. The proposed systems and methods are privacy-preserving in the sense that it does not require knowledge of the thermal dynamics or measurement of the states of the individual homes.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

REFERENCES

[1] D. S. Kirschen, "Demand-side view electricity markets," *IEEE Transactions on power systems*, vol. 18, no. 2, pp. 52-577, 2003.

[2] F. C. Schweppe, R. D. Tabors. J, L. Kirtley, H. R. Outhred, F. H. Pickel, and A. J. Cox, "Homeostatic utility control," *IEEE Transactions on Power Apparatus and Systems*, no. 3 pp. 1151-1163, 1980.

[3] G. Strbac, "Demand side management: Benefits and challenges," *Energy policy*, vol. 36, no. 12, pp. 4419-4426, 2008.

[4] A. M. Carreiro, H. M. Jorge, and C. H. Antunes, "Energy management systems aggregators: A literature survey," *Renewable and Sustainable Energy Reviews*, vol. 73, pp. 1160-1172, 2017.

[5] U.E.I. Administration. (2015) Residential energy consumption survey. [Online]. Available: http://www.eia.gov/consumption/residential/index.cfm

[6] D. S. Callaway and I. A. Hiskens, "Achieving controllability of electric loads," *Proceedings of the IEEE*, vol. 99, no. 1, pp. 184-199, 2010.

[7] W. Turner, I. Walker, and J. Roux, "Peak load reductions: Electric load shifting with mechanical pre-cooling of residential buildings with low thermal mass," *Energy*, vol. 82, pp. 1057-1067, 2015.

[8] J. Mathieu, M. Dyson, D. Callaway, and A. Rosenfeld, "Using residential electric loads for fast demand response: The potential resource and revenues, the costs, and policy recommendations," in *ACEEE Summer Study on Energy Efficiency in Buildings.* Citeseer, 2012, pp. 189203.

[9] S. Koch, J. L. Mathieu, and D. S. Callaway, "Modeling and control of aggregated heterogeneous thermostatically controlled loads for ancillary services," in *Proc. PSCC.* Citeseer, 2011, pp. 1-7.

[10] G. Heffner, "Loads providing ancillary services: Review of international experience," 2008.

[11] Hao, Y. Lin, A. S. Kowli, P. Barooah, and S. Meyn, "Ancillary service to the grid through control of fans in commercial building hvac systems," *IEEE Transactions on smart grid*, vol. 5, no. 4, pp. 20662074, 2014.

[12] D.-c. Wei and N. Chen "Air conditioner direct load control by multi-pass dynamic programming," *IEEE Transactions on Power Systems*, vol. 10, no. 1, pp. 307-313, 1995.

[13] C. Kurucz, D. Brandt, and S. Sim, "A linear programming model for reducing system peak through customer load control programs," *IEEE Transactions on Power Systems*, vol. 11, no. 4, pp. 1817-1824, 1996.

[14] T.-F. Lee, M.-Y. Cho, Y.-C. Hsiao, P.-J. Chao, and F.-M. Fang, "Optimization and implementation of a load control scheduler using relaxed dynamic programming for large air conditioner loads," *IEEE Transactions on Power Systems*, vol. 23, no. 2, pp. 691-702, 2008.

[15] R. Malhame and C.-Y. Chong, "Electric load synthesis by diffusion approximation of a high-order hybrid-state stochastic system," *IEEE Transactions on Automatic Conrol*, vol. 30, no, 9,pp. 854-860, 1985.

[16] J. L. Mathieu, S. Koch, and D. S. Callaway, "State estimation and control of electric loads to manage real-time energy imbalance," *IEEE Transactions on Power Systems*, vol. 28, no. 1, pp. 430-440, 2012.

[17] D. S. Callaway, "Tapping the energy storage potential in electric loads to deliver load following and regulation, with application to wind energy," *Energy Conversion and Management*, vol. 50, no. 5, pp. 1389-1400, 2009.

[18] K. Kalsi, M. Elizondo, J. Fuller, S. Lu, and D. Chassin, "Development and validation of aggregated models for thermostatic controlled loads with demand response," in 2012 *45th Hawaii International Conference on System Systems.* IEEE, 2012, pp. 1959-1966.

[19] W. Zhang J. Lian C.-Y. Chang, and K. Kalsi, "Aggregated modeling and control of air conditioning loads for demand response," *IEEE transactions on power systems*, vol. 28, no. 4, pp. 4655-4664, 2013.

[20] S. P. Meyn, P Barooah, A. Bušić, Y. Chen, and J. Ehren, "Ancillary service to the grid using intelligent deferrable loads," *IEEE Transactions on Automatic Control*, vol. 60, no. 11, pp. 2847-2862, 2015.

[21] D. Docimo and H. K. Fathy, "Demand response using heterogeneous thermostatically controlled loads: Characterization of aggregate power dynamics," *Journal of Dynamic Systems, Measurement, and Control*, vol. 139, no. 10, 2017.

[22] S. Bashash and H. K. Fathy, "Modeling and control insights into demand-side energy management through setpoint controll of thermostatic loads," in *Proceedings of the* 2011 *American Control Conference.* IEEE, 2011, pp. 4546-4553.

[23] B. Ramanathan and V. Vittal, "A framework for evaluation of advanced direct load control with minimum disruption," *IEEE Transactions on Power Systems*, vol. 23, no. 4, pp. 1681-1688, 2008.

[24] K. Bhattacharyya and M. Crow, "A fuzzy logic based approach to direct load control," *IEEE Transactions on Power Systems*, vol. 11, no. 2, pp. 708-714, 1996.

[25] A. Halder, X. Geng, P. Kumar, and L. Xie, "Architecture and algorithms for privacy preserving thermal inertial load managenunn by a load serving entity," *IEEE Transactions on Power Systems*, vol. 32, no 4, pp. 3275-3286, 2016.

[26] A. Halder, X. Geng, F. A. Fontes, P Kumar, and L. Xie. "Optimal power consumption for demand response of thermostatically controlled loads," *Optimal Applicadons and Mettunis*, vol. 40, no. 1, pp. 68-84, 2019.

[27] S. Bhattacharya, K. Kar and J. H. Chow, "Economic operation of thermostatic loads under time varying prices: An optimal control approach," *IEEE Transaction on Sustainable Energy*, vol. 10, no. 4. pp. 1960-1970, 2018.

[28] M. Avci, M. Erkoc, and S. S. Asfour, "Residential hvac load control strategy in real-time electricity pricing environment," in 2012 *IEEE Energytech.* IEEE, 2012, pp. 1-6.

[29] H. T. Nguyen, D. T. Nguyen, and L. B. Le, "Energy management for households with solar assisted thermal load considering renewable energy and price uncertainty," *IEEE Transactions on Smart Grid*, vol. 6, no. 1, pp. 301-314, 2014.

[30] S. Baldi, A. Karagevrekis, I. T. Michailidis, and E. B. Kosmatopoulos, "Joint energy demand and thermal comfort optimization in photovoltaic-equipped interconnected microgrids" *Energy Conversion and Management*, vol. 101, pp. 352-363, 2015.

[31] J. L. Mathieu, M. Kamgarpour, J. Lygeros, G. Andersson, and D. S. Callaway, "Arbitraging intraday wholesale energy market prices with aggregations of thermostatic loads," *IEEE Transactions on Power Systems*, vol. 30, no. 2, pp. 763-772, 2014.

[32] F. Ruelens, B. J. Claessens, S. Vandael, B. De Schutter, R. Babuška, and R. Belmans, "Residential demand response of thermostatically controlled loads using batch reinforcement learning," *IEEE Transaction on Smart Grid*, vol. 8. no. 5, pp. 2149-2159, 2016.

[33] H. Kazmi, J. Suykens, A. Balint, and J. Driesen, "Multi-agent re-inforcement learning for modeling and control of the thermostatically controlled loads," *Applied energy*, vol. 238, pp. 1022-1035, 2019.

[34] B. J. Claessens, D. Vanhoudt, J. Desmedt, and F. Ruelens, "Model-free control of thermostatically controlled loads connected to a district heating network," *Energy and Buildings*, vol. 159, pp. 1-10, 2018.

[35] E. Liu, P. You, and P. Cheng, "Optimal privacy-preserving load scheduling in smart grid," in 2016 *IEEE Power and Energy Society General Meeting (PESGM).* IEEE, 2016, pp. 1-5.

[36] F. A. Fontes, A. Halder, J. Becerril, and P Kumar, "Optimal control of thermostatic loads for planning aggregate consumption: Characterization of solution and explicit strategies," *IEEE Control Systems Letters*, vol. 3, no. 4, pp. 877-882, 2019.

The invention claimed is:

1. A system for thermal load management of a collection of power consumers managed by an electric power aggregator, the system comprising:
 a scheduling subsystem, implemented on one or more processors, configured for determining a plurality of cooling or heating control schedules for the collection of power consumers by forecasting one or more wholesale electricity price peaks, wherein forecasting the one or more wholesale electricity price peaks incudes using a long-short term memory (LSTM) based recurrent neural network architecture to forecast hourly electric prices from historical price data and weather forecasts and wherein determining the heating or cooling control schedules includes solving, using a heuristic relaxation, an optimization problem that, given the forecast hourly electric prices, minimizes a total cost of procuring electricity by an electric power load serving entity (LSE); and a control subsystem, implemented on one or more processors, configured for:

carrying out the cooling or heating control schedules at the individual consumer-level, wherein carrying out the heating or cooling control schedules at the individual consumer level includes broadcasting, from the electric power LSE to smart bilevel thermostats, control commands for switching heating or cooling equipment on or off in accordance with distributed open loop control laws determined from results of the optimization problem; and guaranteeing, for each power consumer of the collection of power consumers, a comfort constraint specified by a bilevel thermostat for the power consumer, wherein the comfort constraint comprises a lower bound temperature and an upper bound temperature that the power consumer is willing to tolerate.

2. The system of claim 1, wherein the scheduling subsystem is configured for determining the cooling or heating control schedules without sensing or modeling of a plurality of buildings of the collection of power consumers.

3. The system of claim 1, wherein the scheduling subsystem is configured for solving the optimization problem using the relaxation heuristic by approximating that a function that characterizes the forecast hourly electric prices is unimodal.

4. The system of claim 1, wherein forecasting the one or more wholesale electricity price peaks comprises forecasting day-ahead or real-time wholesale electricity price peaks.

5. The system of claim 1, wherein forecasting the one or more wholesale electricity price peaks comprises forecasting based on one or more outdoor temperature forecasts.

6. The system of claim 1, wherein the control subsystem is configured for carrying out the cooling or heating control schedules without sharing temperature or power consumption measurements from the collection of power consumers with the electric power aggregator.

7. The system of claim 1, wherein the control subsystem is configured for carrying out the cooling or heating control schedules without using thermal models of buildings of the power consumers.

8. A method for thermal load management of a collection of power consumers managed by an electric power aggregator, the method comprising:

determining, at a scheduling subsystem implemented on one or more processors, a plurality of cooling or heating control schedules for the collection of power consumers by forecasting one or more wholesale electricity price peaks, wherein forecasting the one or more wholesale electricity price peaks incudes using a long-short term memory (LSTM) based recurrent neural network architecture to forecast hourly electric prices from historical price data and weather forecasts and wherein determining the heating or cooling control schedules includes solving, using a heuristic relaxation, an optimization problem that, given the forecast hourly electric prices, minimizes a total cost of procuring electricity by an electric power load serving entity (LSE);

carrying out the cooling or heating control schedules at the individual consumer-level using a control subsystem implemented on one or more processors, wherein carrying out the heating or cooling control schedules at the individual consumer level includes broadcasting, from the electric power LSE to smart bilevel thermostats, control commands for switching heating or cooling equipment on or off in accordance with distributed open loop control laws determined from results of the optimization problem; and guaranteeing, for each power consumer of the collection of power consumers, a comfort constraint specified by a bilevel thermostat for the power consumer, wherein the comfort constraint comprises a lower bound temperature and an upper bound temperature that the power consumer is willing to tolerate.

* * * * *